(12) United States Patent
Turner

(10) Patent No.: US 6,170,585 B1
(45) Date of Patent: Jan. 9, 2001

(54) TRAILER DRIVER

(76) Inventor: Lee A. Turner, 4450 N. Caroline Ave., Indianapolis, IN (US) 46205

( * ) Notice: Under 35 U.S.C. 154(b), the term of this patent shall be extended for 0 days.

(21) Appl. No.: 09/164,653

(22) Filed: Oct. 1, 1998

(51) Int. Cl.[7] .................................................. B62M 7/14
(52) U.S. Cl. ............................................ 180/13; 180/14.2
(58) Field of Search ................................ 180/13, 12, 11, 180/14.2, 15, 16

(56) References Cited

U.S. PATENT DOCUMENTS

| | | | | |
|---|---|---|---|---|
| 3,156,315 | * | 11/1964 | Hawgood | 180/11 |
| 3,387,681 | * | 6/1968 | Rabjohn | 180/13 |
| 3,439,764 | * | 4/1969 | Kimball | 180/11 |
| 3,921,744 | * | 11/1975 | Benoit et al. | 180/13 |
| 3,942,823 | * | 3/1976 | Shields et al. | 180/11 |
| 4,162,711 | * | 7/1979 | Cornelius | 180/13 |
| 4,860,841 | * | 8/1989 | Sacco | 180/13 |
| 5,016,720 | * | 5/1991 | Coker | 180/13 |
| 5,127,488 | * | 7/1992 | Shanahan | 180/181 |
| 5,307,889 | * | 5/1994 | Bohannan | 180/13 |
| 5,325,934 | * | 7/1994 | Larson | 180/13 |
| 5,350,029 | * | 9/1994 | Figueroa | 180/11 |

* cited by examiner

Primary Examiner—Kevin Hurley
Assistant Examiner—Andrew J. Fischer

(57) ABSTRACT

A trailer driver for guiding and driving a trailer when the trailer is disconnected from the hitch of a vehicle. The device includes a support frame and a ground engaging wheel rotatably mounted to the support frame. A mounting bracket is pivotally coupled to the support frame and is adapted for mounting the support frame to a trailer tongue. A motor is provided for rotating the ground engaging wheel. A steering handle upwardly extends from the support frame.

7 Claims, 2 Drawing Sheets

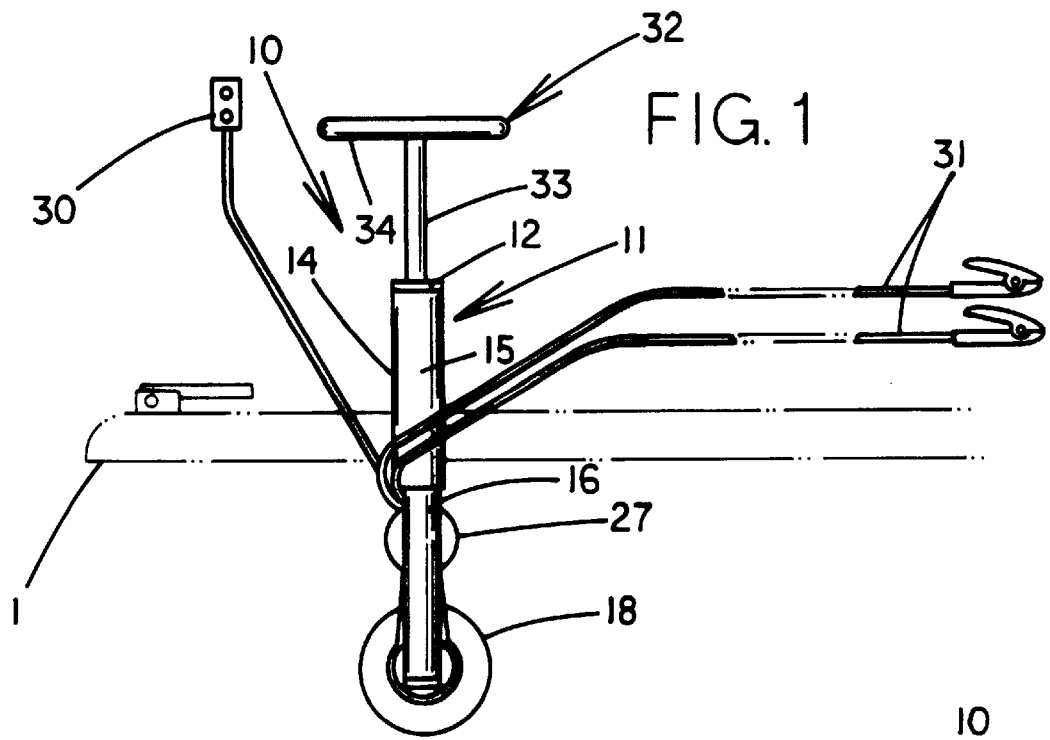
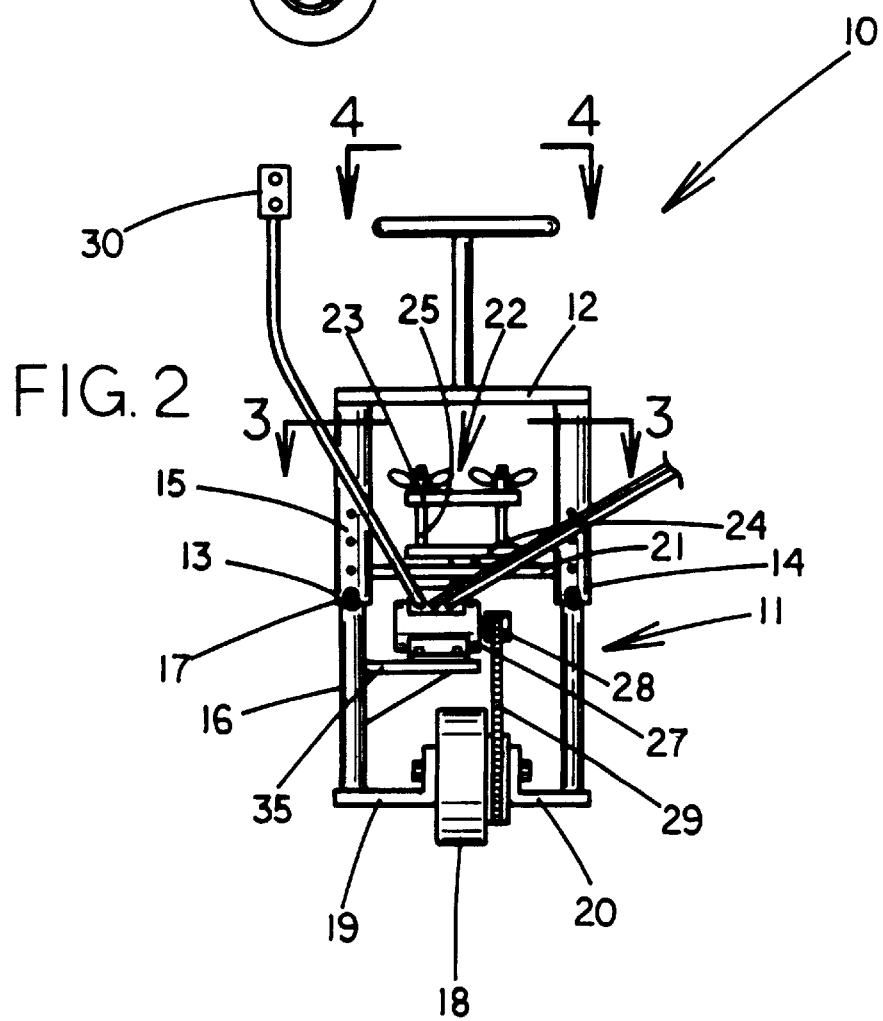

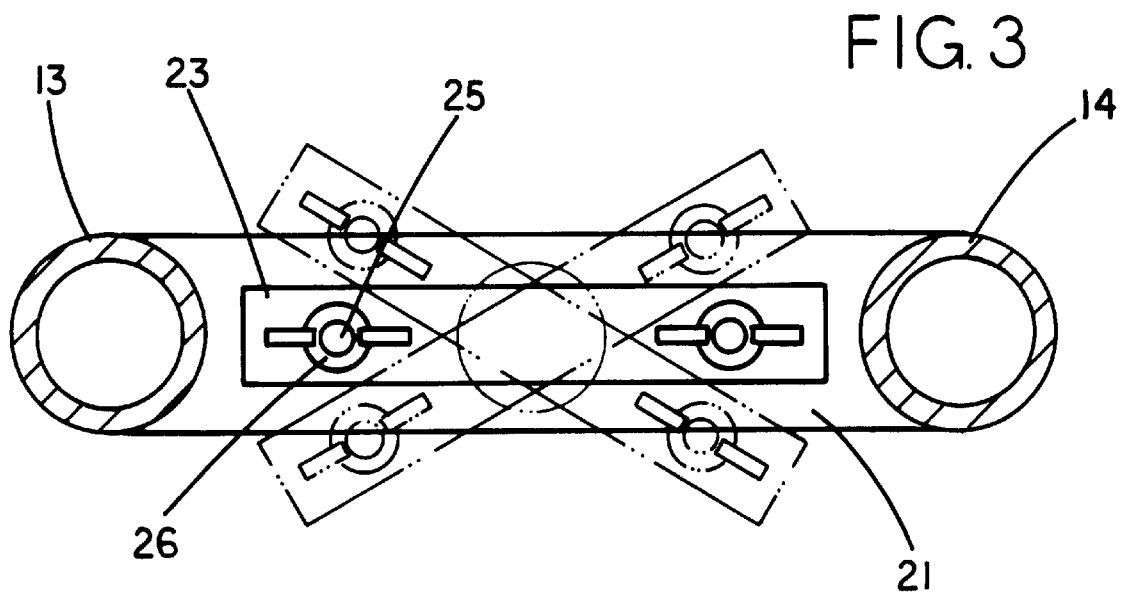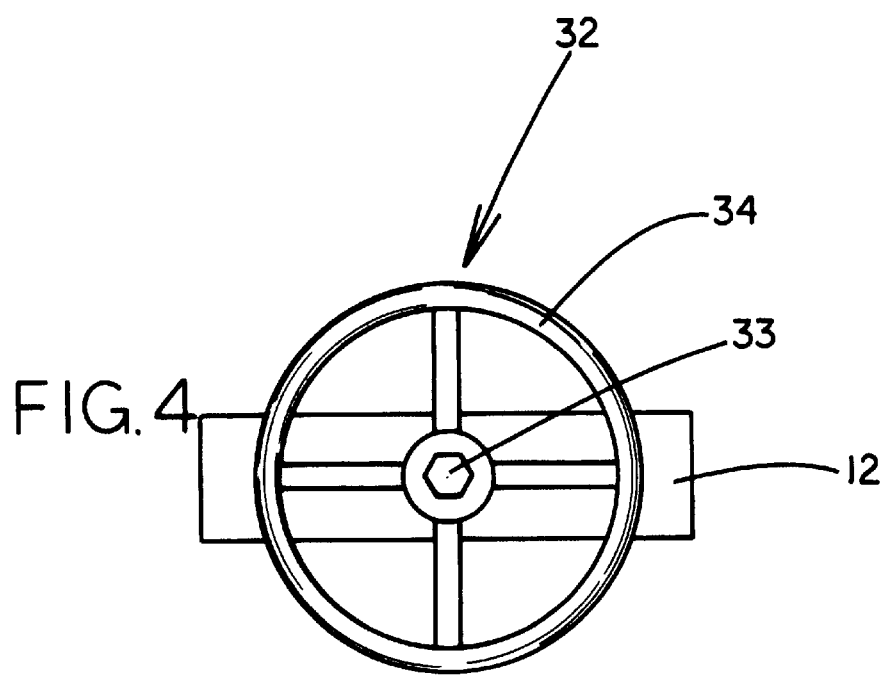

TRAILER DRIVER

BACKGROUND OF THE INVENTION

1. Field of the Invention

The present invention relates to devices for guiding and driving trailers and more particularly pertains to a new trailer driver for guiding and driving a trailer when the trailer is disconnected from the hitch of a vehicle.

2. Description of the Prior Art

The use of devices for guiding and driving trailers is known in the prior art. More specifically, devices for guiding and driving trailers heretofore devised and utilized are known to consist basically of familiar, expected and obvious structural configurations, notwithstanding the myriad of designs encompassed by the crowded prior art which have been developed for the fulfillment of countless objectives and requirements.

Known prior art devices include U.S. Pat. No. 3,861,482; U.S. Pat. No. 4,860,841; U.S. Pat. No. 4,210,217; U.S. Pat. No. 5,282,515; U.S. Pat. No. 4,162,711; and U.S. Pat. No. 3,861,483.

While these devices fulfill their respective, particular objectives and requirements, the aforementioned patents do not disclose a new trailer driver. The inventive device includes a support frame and a ground engaging wheel rotatably mounted to the support frame. A mounting bracket is pivotally coupled to the support frame and is adapted for mounting the support frame to a trailer tongue. A motor is provided for rotating the ground engaging wheel. A steering handle upwardly extends from the support frame.

In these respects, the trailer driver according to the present invention substantially departs from the conventional concepts and designs of the prior art, and in so doing provides an apparatus primarily developed for the purpose of guiding and driving a trailer when the trailer is disconnected from the hitch of a vehicle.

SUMMARY OF THE INVENTION

In view of the foregoing disadvantages inherent in the known types of devices for guiding and driving trailers now present in the prior art, the present invention provides a new trailer driver construction wherein the same can be utilized for guiding and driving a trailer when the trailer is disconnected from the hitch of a vehicle.

The general purpose of the present invention, which will be described subsequently in greater detail, is to provide a new trailer driver apparatus and method which has many of the advantages of the devices for guiding and driving trailers mentioned heretofore and many novel features that result in a new trailer driver which is not anticipated, rendered obvious, suggested, or even implied by any of the prior art devices for guiding and driving trailers, either alone or in any combination thereof.

To attain this, the present invention generally comprises a support frame and a ground engaging wheel rotatably mounted to the support frame. A mounting bracket is pivotally coupled to the support frame and is adapted for mounting the support frame to a trailer tongue. A motor is provided for rotating the ground engaging wheel. A steering handle upwardly extends from the support frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new trailer driver apparatus and method which has many of the advantages of the devices for guiding and driving trailers mentioned heretofore and many novel features that result in a new trailer driver which is not anticipated, rendered obvious, suggested, or even implied by any of the prior art devices for guiding and driving trailers, either alone or in any combination thereof.

It is another object of the present invention to provide a new trailer driver which may be easily and efficiently manufactured and marketed.

It is a further object of the present invention to provide a new trailer driver which is of a durable and reliable construction.

An even further object of the present invention is to provide a new trailer driver which is susceptible of a low cost of manufacture with regard to both materials and labor, and which accordingly is then susceptible of low prices of sale to the consuming public, thereby making such trailer driver economically available to the buying public.

Still yet another object of the present invention is to provide a new trailer driver which provides in the apparatuses and methods of the prior art some of the advantages thereof, while simultaneously overcoming some of the disadvantages normally associated therewith.

Still another object of the present invention is to provide a new trailer driver for guiding and driving a trailer when the trailer is disconnected from the hitch of a vehicle.

Yet another object of the present invention is to provide a new trailer driver which includes a support frame and a ground engaging wheel rotatably mounted to the support frame. A mounting bracket is pivotally coupled to the support frame and is adapted for mounting the support frame to a trailer tongue. A motor is provided for rotating the ground engaging wheel. A steering handle upwardly extends from the support frame.

Still yet another object of the present invention is to provide a new trailer driver that is mountable to the trailer tongue to allow easy maneuvering of the trailer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new trailer driver in use according to the present invention.

FIG. 2 is another schematic side view of the present invention.

FIG. 3 is a schematic cross sectional view of the present invention taken from line 3—3 of FIG. 2.

FIG. 4 is a schematic top side view of the present invention as seen from the vantage of line 4—4 of FIG. 2.

DESCRIPTION OF THE PREFERRED EMBODIMENT

With reference now to the drawings, and in particular to FIGS. 1 through 4 thereof, a new trailer driver embodying the principles and concepts of the present invention and generally designated by the reference numeral 10 will be described.

The trailer driver is designed for mounting to a trailer tongue 1 of a trailer to permit moving of the trailer when unhitched from a vehicle. As best illustrated in FIGS. 1 through 4, the trailer driver 10 generally comprises a support frame 11 and a ground engaging wheel 18 rotatably mounted to the support frame 11. A mounting bracket 22 is pivotally coupled to the support frame 11 and is adapted for mounting the support frame 11 to a trailer tongue 1. A motor 27 is provided for rotating the ground engaging wheel 18. A steering handle 32 upwardly extends from the support frame 11.

Specifically, the support frame 11 has a top bar 12 and a pair of spaced apart elongate side legs 13, 14 downwardly depending from the top bar 12 of the support frame 11. The top bar 12 is preferably generally rectangular and has generally planar top and bottom surfaces, and a pair of opposite ends. Each of the side legs 13, 14 has upper and lower ends, and a longitudinal axis extending between the upper and lower ends of the side leg. The upper ends of the side legs 13, 14 are coupled to the bottom surface of the top bar 12. One of the side legs 13 is positioned adjacent one of the ends of the top bar 12 while the other side leg 14 is positioned adjacent the other end of the top bar 12. Preferably, the longitudinal axes of the side legs 13, 14 are generally parallel to one another and extending generally perpendicular to the top bar 12. In the preferred embodiment, each of the side legs 13, 14 is telescopically extendable to permit selective adjustment of the length of each side leg between the upper and lower ends of the side legs. In this embodiment, each support leg has upper and lower portions 15, 16. The upper portion 15 is position adjacent the upper end of the side leg and the lower portion 16 is positioned adjacent the lower end of the side leg. The upper portion 15 of each side leg telescopically receives the associated lower portion 16 of the side leg. Each of the side legs 13, 14 has a lock pin 17 for releasably holding the lower portion 16 of the support leg in a position with respect to the upper portion 15 of the support leg.

The ground engaging wheel 18 is rotatably mounted to the support frame 11. Preferably, the lower end of each of the side legs 13, 14 has a mounting foot 19, 20 coupled thereto. The mounting feet 19, 20 are inwardly extended towards one another such that the mounting feet 19, 20 face each other. The ground engaging wheel 18 is rotatably mounted to the mounting feet 19, 20 to permit free rotation of the ground engaging wheel 18.

The support frame 11 has a cross bar 21 extending between the side legs 13, 14. The cross bar 21 has generally planar upper and lower surfaces and preferably lies in a plane generally parallel to the top bar 12 and generally perpendicular to the longitudinal axes of the side legs 13, 14. The mounting bracket 22 is pivotally coupled to the cross bar 21 of the support frame 11. The mounting bracket 22 is designed for detachably mounting the support frame 11 to a trailer tongue 1 extended between the side legs 13, 14 and above the cross bar 21 as illustrated in FIG. 1. With reference to FIG. 3, the mounting bracket 22 is pivotable about an axis extending generally parallel to the longitudinal axes of the side legs 13, 14 and generally perpendicular to the top bar 12. Preferably, the mounting bracket 22 has spaced apart top and bottom plates 23, 24 with the bottom plate 24 pivotally coupled to the cross bar 21. The top plate 23 of the mounting bracket 22 is detachably attached to the bottom plate 24 of the mounting bracket 22 by a pair of spaced apart threaded bolts 25 upwardly extending from the bottom plate 24 and secured with a pair of nuts 26. In use, the trailer tongue 1 is extended between the top and bottom plates 23, 24 and held in place between the top and bottom plates 23, 24 by tightening the nuts 26 on the bolts 25.

The motor 27 is provided for rotating the ground engaging wheel 18 in both clockwise and counter-clockwise directions. The motor 27 is preferably mounted to the support frame 11 on a platform 35 coupled to one of the side legs 13. The motor 27 has a rotating shaft 28 which rotates when the motor is energized. A drive chain 29 is looped around the rotating shaft 28 and an axle of the ground engaging wheel 18 to permit rotation of the ground engaging wheel 18 by the motor 27 in the appropriate direction when the rotating shaft 28 is rotated. The motor 27 has a remote controller 30 electrically connected thereto to permit selective activation of the motor 27 by a user and to permit selection of the direction which the ground engaging wheel 18 is rotated by the motor 27 (that is: both forwards and in reverse). The motor 27 also has battery clamp cables 31 for electrically connecting the motor 27 to a battery power source such as the battery of a vehicle.

The steering handle 32 upwardly extends from the top surface of the top bar 12 of the support frame 11. The steering handle 32 has an elongate shaft 33 and a steering wheel 34 coupled to the shaft 33. The shaft 33 is coupled to the top surface of the top bar 12. Preferably, the shaft 33 has a longitudinal axis extending generally perpendicular to the top bar 12 and generally parallel to the axis of pivoting of the mounting bracket 22. In use, the steering handle 32 permits the user to turn the support frame 11 and wheel 18 with respect to the mounted trailer tongue 1 to aid steering of the trailer when using the device.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for mounting to a trailer tongue of a trailer, said device comprising:

a support frame;

a ground engaging wheel being rotatably mounted to said support frame;

a mounting bracket being pivotally coupled to said support frame, said mounting bracket being adapted for mounting said support frame to a trailer tongue;

a motor for rotating said ground engaging wheel; and a steering handle upwardly extending from said support frame;

said support frame having a top bar and a pair of spaced apart elongate side legs downwardly depending from said top bar of said support frame, each of said side legs having upper and lower ends and a longitudinal axis extending between said upper and lower ends of said side leg, said upper ends of said side legs being coupled to said top bar, one of said side legs being positioned adjacent one of said ends of said top bar, another of said side legs being positioned adjacent another of said ends of said top bar; and each of said side legs being telescopically extendable.

2. The device of claim 1, wherein said longitudinal axes of said side legs are generally parallel to one another and extending generally perpendicular to said top bar.

3. The device of claim 1, wherein said lower end of each of said side legs has a mounting foot coupled thereto, said mounting feet being inwardly extended towards one another such that the mounting feet face each other, said ground engaging wheel being rotatably mounted to said mounting feet to permit free rotation of said ground engaging wheel.

4. The device of claim 1, wherein said support frame has a cross bar, said mounting bracket being pivotally coupled to said cross bar of said support frame.

5. The device of claim 1, wherein said motor has a remote controller electrically connected thereto to permit selective activation of said motor by a user.

6. The device of claim 1, wherein said steering handle has an elongate shaft and a steering wheel coupled to said shaft, said shaft being coupled to said support frame.

7. A device for mounting to a trailer tongue of a trailer for moving the trailer when unhitched from a vehicle, said device comprising:

a support frame having a top bar and a pair of spaced apart elongate side legs downwardly depending from said top bar of said support frame;

said top bar being generally rectangular and having generally planar top and bottom surfaces, and a pair of opposite ends;

each of said side legs having upper and lower ends, and a longitudinal axis extending between said upper and lower ends of said side leg;

said upper ends of said side legs being coupled to said bottom surface of said top bar, one of said side legs being positioned adjacent one of said ends of said top bar, another of said side legs being positioned adjacent another of said ends of said top bar;

said longitudinal axes of said side legs being generally parallel to one another and extending generally perpendicular to said top bar;

each of said side legs being telescopically extendable;

each support leg having upper and lower portions, said upper portion being position adjacent said upper end of the side leg, said lower portion being positioned adjacent said lower end of the side leg, said upper portion of each side leg telescopically receiving the associated lower portion of the side leg;

a ground engaging wheel being rotatably mounted to said support frame;

said lower end of each of said side legs having a mounting foot coupled thereto, said mounting feet being inwardly extended towards one another such that the mounting feet face each other, said ground engaging wheel being rotatably mounted to said mounting feet to permit free rotation of said ground engaging wheel;

said support frame having a cross bar extending between said side legs, said cross bar having generally planar upper and lower surfaces, said cross bar lying in a plane generally parallel to said top bar and generally perpendicular to said longitudinal axes of said side legs;

a mounting bracket being pivotally coupled to said cross bar of said support frame, said mounting bracket being adapted for detachably mounting said support frame to a trailer tongue extended between said side legs;

said mounting bracket being pivotable about an axis extending generally parallel to said longitudinal axes of said side legs and generally perpendicular to said top bar;

a motor for rotating said ground engaging wheel, said motor being mounted to said support frame;

said motor having a remote controller electrically connected thereto to permit selective activation of said motor by a user; and a steering handle upwardly extending from said top surface of said top bar of said support frame, said steering handle having an elongate shaft and a steering wheel coupled to said shaft, said shaft being coupled to said top surface of said top bar, said shaft having a longitudinal axis extending generally perpendicular to said top bar.

* * * * *